(12) United States Patent
Matsuzawa

(10) Patent No.: US 12,731,614 B2
(45) Date of Patent: Sep. 8, 2026

(54) MAGNETIC DISK DEVICE, CONTROL METHOD, AND LEARNING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuji Matsuzawa, Kashiwa Chiba (JP)

(73) Assignees: KABUSHIKI KAISHA TOSHIBA, Tokyo (JP); TOSHIBA, ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 19/189,379

(22) Filed: Apr. 25, 2025

(65) Prior Publication Data

US 2026/0088049 A1 Mar. 26, 2026

(30) Foreign Application Priority Data

Sep. 20, 2024 (JP) ................................ 2024-163971

(51) Int. Cl.
*G11B 5/55* (2006.01)
*G11B 19/04* (2006.01)
*G11B 20/10* (2006.01)
*G11B 20/20* (2006.01)

(52) U.S. Cl.
CPC ...... *G11B 19/045* (2013.01); *G11B 20/10518* (2013.01)

(58) Field of Classification Search
CPC ..... G11B 19/04; G11B 5/59653; G11B 27/36; G11B 19/048; G11B 5/09; G11B 2005/0021; G11B 5/5539; G11B 20/20; G11B 5/59627
USPC ................................................ 360/75, 77.04
See application file for complete search history.

(56) References Cited

U.S. PATENT DOCUMENTS

| | | | | |
|---|---|---|---|---|
| 5,270,880 | A | 12/1993 | Ottesen et al. | |
| 6,496,315 | B1 | 12/2002 | Ueda et al. | |
| 7,046,478 | B2 | 5/2006 | Zhang et al. | |
| 9,064,526 | B1 * | 6/2015 | Kawabe ................. | G11B 27/36 |

FOREIGN PATENT DOCUMENTS

| | | | |
|---|---|---|---|
| JP | 3062606 | B2 | 7/2000 |

* cited by examiner

*Primary Examiner* — Nabil Z Hindi
(74) *Attorney, Agent, or Firm* — Maier & Maier, PLLC

(57) ABSTRACT

According to one embodiment of a magnetic disk device, a controller determines, by using a determination model, whether or not a distance in a radial direction from a target position related to a first track to a position of a magnetic head exceeds a threshold. The position of the magnetic head fluctuates from the target position toward a second track during execution of writing to the first track. The controller performs writing to the first track when the distance does not exceed the threshold, and performs no writing to the first track when the distance exceeds the threshold. The determination model is a learned model configured to receive pieces of position error information obtained by reading servo information from servo areas and output a value representing whether or not the distance exceeds the threshold while the magnetic head moves above the servo areas.

14 Claims, 11 Drawing Sheets

FIG.1

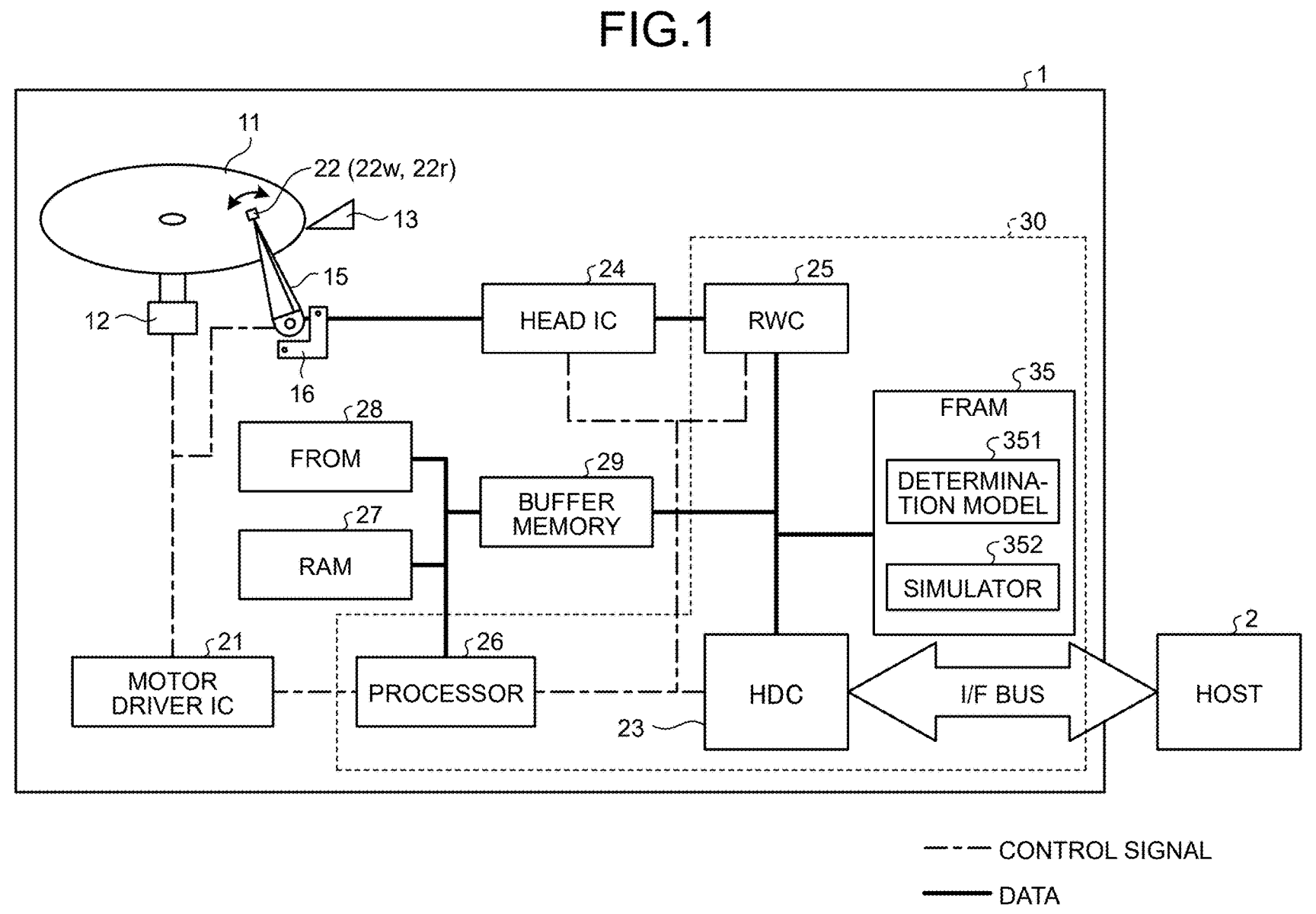

1
2 HOST
30
35 FRAM
351 DETERMINATION MODEL
352 SIMULATOR
I/F BUS
25 RWC
23 HDC
24 HEAD IC
29 BUFFER MEMORY
26 PROCESSOR
28 FROM
27 RAM
21 MOTOR DRIVER IC
11
12
13
15
16
22 (22w, 22r)

CONTROL SIGNAL
DATA

MAGNETIC DISK DEVICE, CONTROL METHOD, AND LEARNING METHOD

CROSS-REFERENCE TO RELATED APPLICATIONS

This application is based upon and claims the benefit of priority from Japanese Patent Application No. 2024-163971, filed on Sep. 20, 2024; the entire contents of which are incorporated herein by reference.

FIELD

Embodiments described herein relate generally to a magnetic disk device, a control method, and a learning method.

BACKGROUND

In a magnetic disk device, a magnetic head performs data writing and data reading to and from a magnetic disk. It is desirable to appropriately control an operation of the magnetic head.

BRIEF DESCRIPTION OF THE DRAWINGS

FIG. 1 is a schematic diagram illustrating an example of a configuration of a magnetic disk device according to a first embodiment;

DETAILED DESCRIPTION

Figure 2:
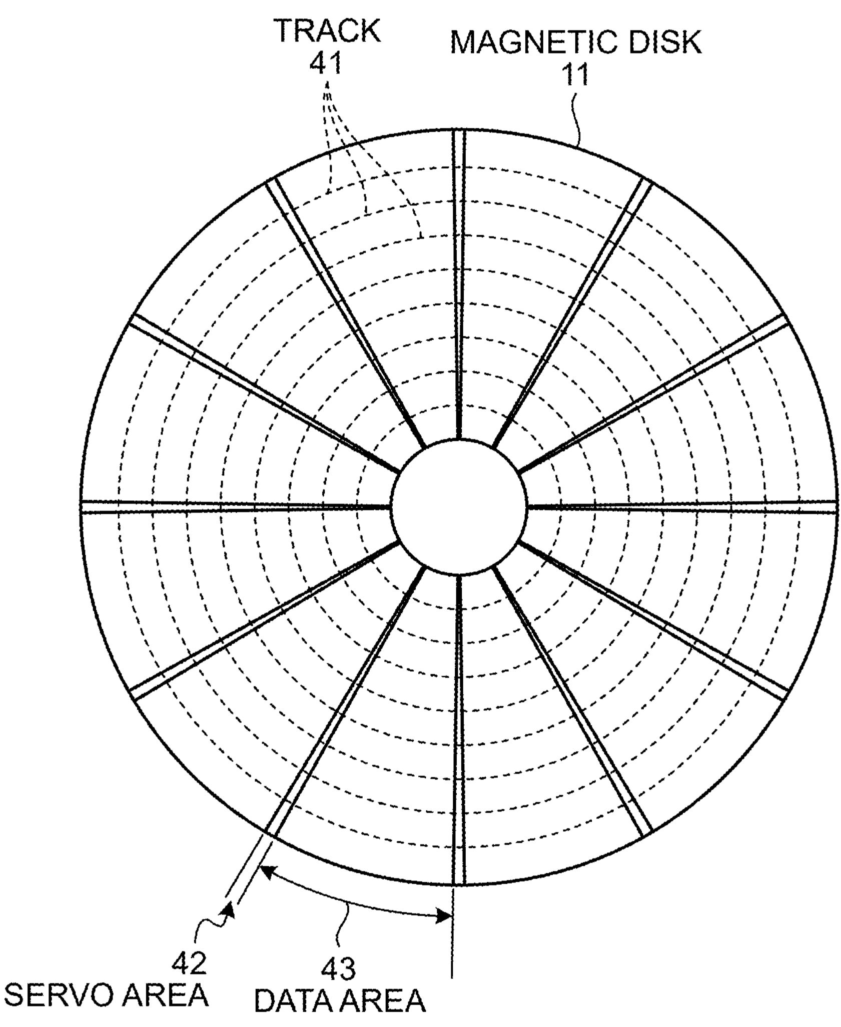
FIG. 2 is a schematic diagram illustrating an example of a configuration of a magnetic disk according to the first embodiment.

According to one embodiment, a magnetic disk device includes a magnetic disk, a magnetic head, and a controller. On the magnetic disk, tracks are provided. The tracks each include a data area and a servo area in which servo information is recorded. The magnetic head is configured to perform reading and writing from and to the tracks. The controller is configured to determine, by using a determination model, whether or not a distance in a radial direction from a target position related to a first track among the tracks to a position of the magnetic head exceeds a threshold. The position of the magnetic head fluctuating from the target position toward a second track different from the first track among the tracks during execution of writing to the first track. The controller is configured to perform writing to the first track in a case where the distance does not exceed the threshold. The controller is configured to perform no writing to the first track in a case where the distance exceeds the threshold. The determination model is a learned model configured to receive pieces of position error information obtained by reading the servo information from the servo areas and output a value representing whether or not the distance exceeds the threshold while the magnetic head moves above the servo areas.

Exemplary embodiments of a magnetic disk device, a control method, and a learning method according to embodiments will be described below in detail with reference to the accompanying drawings. The present invention is not limited to the following embodiments.

First Embodiment

FIG. 1 is a schematic diagram illustrating an example of a configuration of a magnetic disk device 1 according to a first embodiment.

The magnetic disk device 1 is connected to a host 2. The magnetic disk device 1 can receive an access command such as a write command or a read command from the host 2.

The magnetic disk device 1 includes a magnetic disk 11 on which a recording surface is provided. The magnetic disk device 1 performs data writing and data reading to and from the magnetic disk 11 (more precisely, the recording surface of the magnetic disk 11) in response to the access command. Note that the magnetic disk device 1 may include a plurality of magnetic disks 11, but in the embodiment, the magnetic disk device 1 includes a single magnetic disk 11 for the sake of simplicity of description and illustration.

Data is written and read via a magnetic head 22. In addition to the magnetic disk 11, the magnetic disk device 1 includes a spindle motor 12, a motor driver integrated circuit (IC) 21, a magnetic head 22, an actuator arm 15, a voice coil motor (VCM) 16, a lamp 13, a head IC 24, a read/write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 attached to a rotation shaft of the magnetic disk 11. The spindle motor 12 is driven by the motor driver IC 21.

The motor driver IC 21 controls the rotation of the spindle motor 12 and the rotation of the VCM 16.

The magnetic head 22 performs data writing and data reading to and from the magnetic disk 11 using a write element 22$w$ and a read element 22$r$ provided therein.

The magnetic head 22 is attached to a distal end of the actuator arm 15. The magnetic head 22 is moved in a radial direction of the magnetic disk 11 by the VCM 16 driven by the motor driver IC 21.

When the rotation of the magnetic disk 11 is stopped, the magnetic head 22 is moved onto the lamp 13. The lamp 13 is configured to hold the magnetic head 22 at a position separated from the magnetic disk 11.

At the time of reading, the head IC 24 amplifies and outputs a signal read from the magnetic disk 11 by the magnetic head 22, and supplies the amplified signal to the RWC 25. In addition, the head IC 24 amplifies a signal corresponding to data to be written supplied from the RWC 25 and supplies the amplified signal to the magnetic head 22.

The HDC 23 performs control of transmission and reception of data with the host 2 via an I/F bus, control of the buffer memory 29, error correction processing of read data, and the like.

The buffer memory 29 is used as a buffer for data transmitted to and received from the host 2. Specifically, the buffer memory 29 is used for temporarily storing data to be written to the magnetic disk 11 or data read from the magnetic disk 11.

The buffer memory 29 includes, for example, a volatile memory capable of high-speed operation. A type of the memory configuring the buffer memory 29 is not limited to a specific type. The buffer memory 29 can be configured by, for example, a dynamic random access memory (DRAM), a static random access memory (SRAM), or a combination thereof.

The RWC 25 modulates data to be written supplied from the HDC 23 and supplies the data to the head IC 24. In addition, the RWC 25 demodulates the signal read from the magnetic disk 11 and supplied from the head IC 24, and outputs the demodulated signal to the HDC 23 as digital data.

A flash random access memory (FRAM) 35 is connected to the RWC 25 and the HDC 23. The FRAM 35 is a readable/writable nonvolatile memory. The FRAM 35 stores a determination model 351 and a simulator 352. The simulator 352 simulates position error information to be described later. Details of the determination model 351 will be described later.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. Note that the firmware may be stored in the magnetic disk 11.

The RAM 27 includes, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk device 1 according to firmware stored in the FROM 28 or the magnetic disk 11. The processor 26 loads firmware from the FROM 28 or the magnetic disk 11 to the RAM 27, and executes control of the motor driver IC 21, the head IC 24, the RWC 25, the HDC 23, and the like according to the loaded firmware.

Note that a configuration including the RWC 25, the processor 26, the FRAM 35, and the HDC 23 can also be regarded as the controller 30. In addition to these components, the controller 30 may include other components (for example, the RAM 27, the FROM 28, the buffer memory 29, the RWC 25, or the like).

FIG. 2 is a schematic diagram illustrating an example of a configuration of the magnetic disk 11 of the first embodiment.

In a manufacturing process, servo information is written to the magnetic disk 11 by, for example, a servo writer or self-servo write (SSW). FIG. 2 illustrates servo areas 42 that are radially provided, as an example of an arrangement of the servo areas in which the servo information is written.

The servo information includes sector/cylinder information, a burst pattern, a post code, and the like. The sector/cylinder information can give a servo address (servo sector address) in a circumferential direction and a servo address (track address) in the radial direction of the magnetic disk 11. At the time of operation of the magnetic disk device 1, the sector/cylinder information is used for controlling a seek operation for moving the magnetic head 22 to a target track.

The burst pattern is data used for detecting an amount of positional deviation in the radial direction of the magnetic head 22 with respect to a center (hereinafter, abbreviated as a track center) of the track 41, and includes a repetitive pattern of a predetermined cycle. A cylinder address is given as, for example, an integer value. It is possible to obtain an offset amount below the decimal point based on a position indicated by the cylinder address by demodulating the burst pattern.

By the way, the position of a track defined by the burst pattern may deviate (or may be shifted) from an actual position of the track due to a write error of the servo information. Since this positional deviation is repeatedly generated in the same manner with one rotation of the magnetic disk (and the spindle motor) as a cycle, it is called Repeatable Run-Out (RRO). In the manufacturing process, the RRO is learned for each track, and a learning value of the RRO is written to the magnetic disk 11 as a post code. Then, when the magnetic head 22 is positioned on the target track at the time of use of the magnetic disk device 1, control is executed to cancel the positional deviation due to the RRO based on the post code.

According to FIG. 2, concentric tracks 41 are set by the burst pattern and the post code. The servo area 42 on one track 41 may be referred to as a servo sector. A data area 43 in which data can be written is provided between the servo areas 42 (namely, servo sectors) on the circumference of each track 41. In the data area 43, data sectors are continuously provided. Data writing and data reading are performed by the magnetic head 22 for each data sector.

The signal read by the magnetic head 22 (more precisely, the read element 22$r$) includes servo information read from the servo sector and data read from the data sector. The servo information read by the magnetic head 22 is demodulated by the head IC 24 into a position error signal (hereinafter, also referred to as "position error information" and "demodulated value") indicating a relative position of the magnetic head 22 from the track, and is supplied to the controller 30. Since demodulation noise is added at the time of demodulation, this position error signal is different from an actual relative position (hereinafter, also referred to as an "actual position" and a "true value") of the magnetic head 22. The controller 30 executes positioning control of the magnetic head 22 based on the supplied position error signal in cooperation with the motor driver IC 21.

The controller 30 and the motor driver IC 21 execute, based on the position error signal, feedback control to bring a difference between a position of the target track and a current position of the magnetic head 22 close to zero.

A movement operation of the magnetic head 22 includes a seek operation and a track following operation. The seek operation is an operation of moving the magnetic head 22 in the radial direction of the magnetic disk 11 toward the target track. The track following operation is an operation of maintaining the position of the magnetic head 22 on the target track after the magnetic head 22 is moved to a vicinity of the target track by the seek operation. In the track following operation, the position of the magnetic head 22 is adjusted by the feedback control such that the magnetic head 22 relatively moves along the target track. A state in which the position of the magnetic head 22 is maintained on the target track is referred to as an on-track state.

Data writing and data reading are executed when the magnetic head 22 is in the on-track state. The controller 30 determines whether or not the magnetic head 22 is in the on-track state, and executes data writing or data reading by using the magnetic head 22 when the magnetic head 22 is in the on-track state.

The controller 30 performs the determination as to whether or not the magnetic head 22 is in the on-track state, based on a threshold set with reference to the position of the track. The threshold used for determining the on-track state during the write operation is referred to as a write offtrack slice (WOS).

Figure 3:
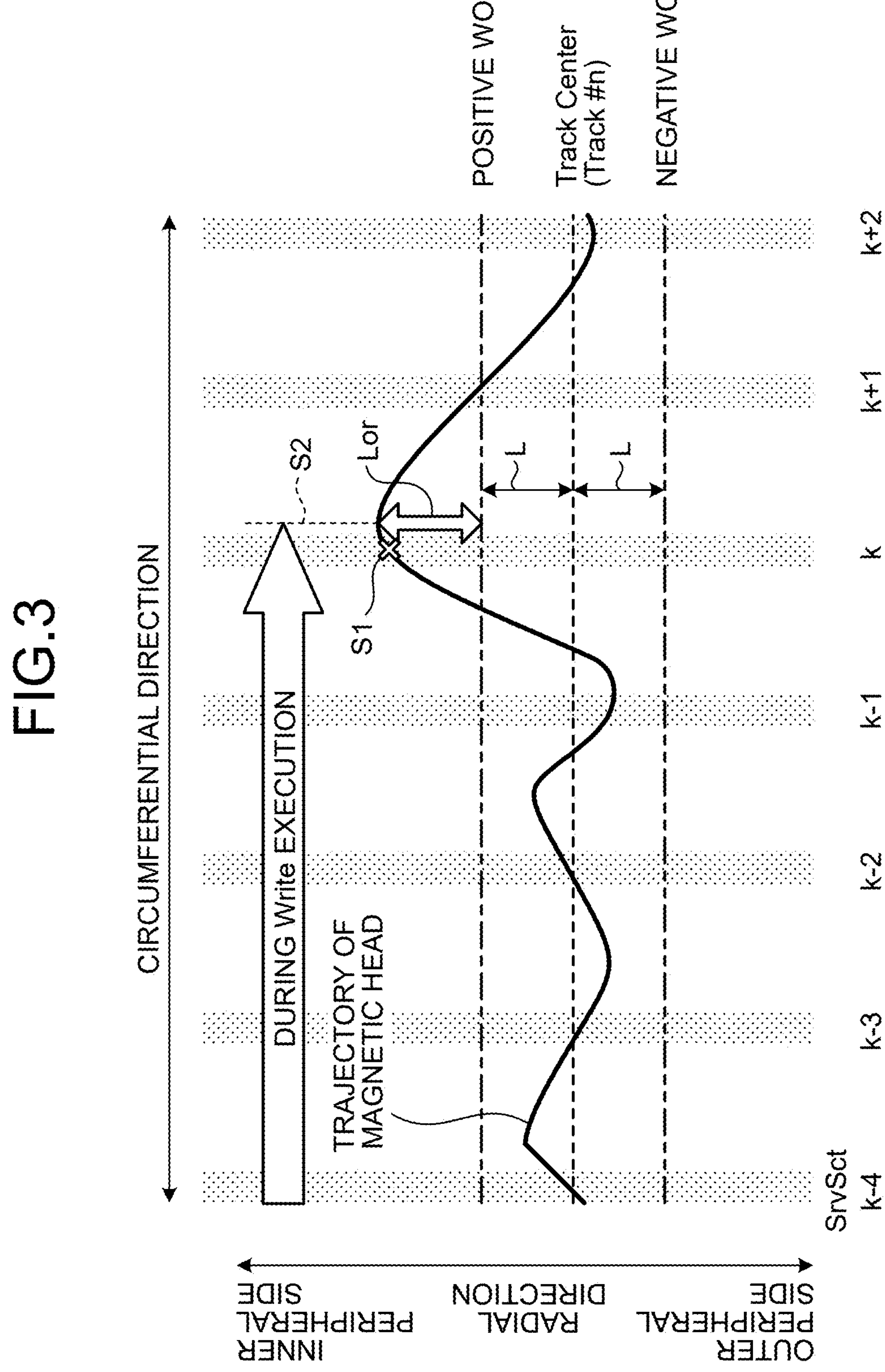
FIG. 3 is a schematic diagram for describing an example of an operation of a magnetic head according to the first embodiment at a time of data writing.

FIG. 3 is a schematic diagram for describing an example of the operation of the magnetic head 22 according to the first embodiment at the time of data writing.

When referring to the position in the radial direction, an inner peripheral side of the magnetic disk 11 is regarded as a positive side, and an outer peripheral side of the magnetic disk 11 is regarded as a negative side. Regarding the position in the radial direction, a designer can optionally determine which of the inner peripheral side and the outer peripheral side of the magnetic disk 11 is the positive side.

In FIG. 3, servo sectors #k−4 to #k+2 are depicted as a plurality of servo sectors (SrvSct). A center of a track #n is depicted as one of the tracks. A trajectory of the magnetic head 22 when data writing is executed to the track #n is illustrated.

At the time of data writing to the track #n, the position of the magnetic head 22 is adjusted by the track following operation such that the difference between the position of the magnetic head 22 and the track center of the track #n approaches zero. However, due to various disturbances, the position of the magnetic head 22 may fluctuate from a target position that is a position of reading and writing. As a result, as illustrated in FIG. 3, the trajectory of the magnetic head 22 fluctuates from the center of the track #n.

For each track, a fluctuation permitted range of the magnetic head 22 at the time of data writing is set in advance. A line defining a boundary of the fluctuation permitted range is the WOS. According to FIG. 3, a positive WOS is set at a position separated from the center of the track #n by a fixed value L on the positive side, and a negative WOS is set at a position separated from the center of the track #n by the fixed value L on the negative side. The fixed value L can be optionally determined by experimental data or product specifications.

During execution of data writing to the track #n, servo information is read every time the magnetic head 22 passes over the servo sector, and position error information (position error signal) generated from the read servo information is supplied to the controller 30. Every time the position error information is acquired, the controller 30 estimates whether or not the magnetic head 22 is within the fluctuation permitted range based on the acquired position error information.

Specifically, the controller 30 determines whether or not a distance in the radial direction from a target position related to a predetermined track (an example of the first track) to the position of the magnetic head 22 exceeds a threshold value, namely, exceeds the WOS. This is because, as noted above, the position of the magnetic head 22 may fluctuate from the target position toward a side (may be either a side in the inner radial direction or a side in the outer radial direction) of a track (an example of a second track) that is different from the predetermined track (the first track) during execution of writing to the predetermined track. The determination as to the fluctuation is performed by using pieces of position error information obtained by reading servo information from each of a predetermined number of the servo areas 42 and the determination model 351 stored in the FRAM 35. The processing of acquiring the pieces of position error information obtained by reading servo information from each of the predetermined number of the servo areas 42 present in the track 41 is referred to as sampling the pieces of position error information.

Then, the controller 30 executes writing to the first track in a case where the distance from the target position to the position of the magnetic head 22 does not exceed the WOS. On the other hand, in a case where the distance from the target position to the position of the magnetic head 22 exceeds the WOS, the controller 30 does not execute writing to the first track. The situation that the distance from the target position to the position of the magnetic head 22 exceeds the WOS is referred to as off-track.

Figure 4:
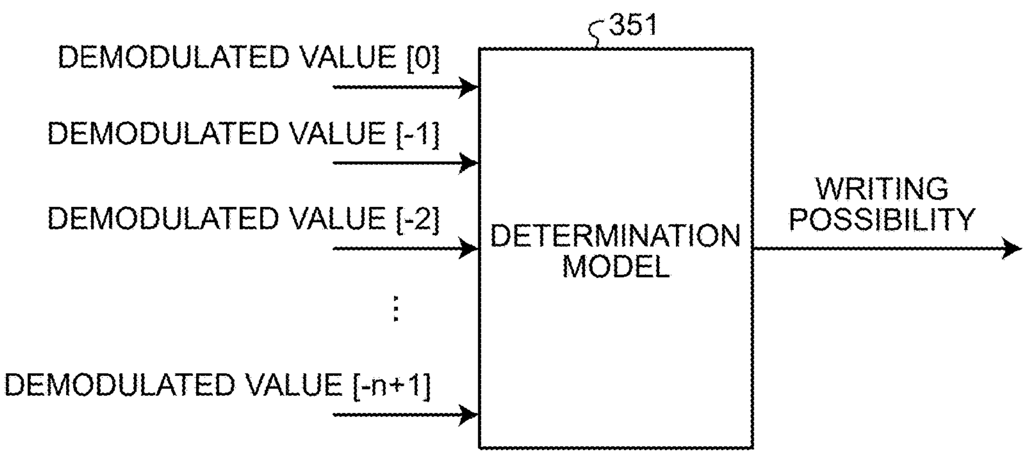
FIG. 4 is a diagram illustrating an example of input and output of a determination model according to the first embodiment.

FIG. 4 is a diagram illustrating an example of input and output of the determination model 351 according to the first embodiment. As illustrated in FIG. 4, the determination model 351 receives pieces of position error information (namely, demodulated values) obtained by reading (or sampling) servo information from each of the servo areas 42, and outputs writing possibility as an output value. In the example of FIG. 4, the determination model 351 receives n demodulated values (pieces of position error information), and outputs one output value representing writing possibility.

The writing possibility indicates whether or not the distance from the target position to the position of the magnetic head 22 exceeds the WOS while the magnetic head 22 moves above the data area 43 from the servo area 42 of a current sector to the servo area 42 of a next sector. When the distance is determined to exceed the WOS, the determination model 351 outputs an output value (for example, "1") indicating that writing is not possible. When the distance is determined not to exceed the WOS, the determination model 351 outputs an output value (for example, "0") indicating that writing is possible.

The determination model 351 is a learned model learned by machine learning, such as deep learning, using pieces of position error information (namely, demodulated values) obtained by reading (sampling) servo information from each of the servo areas 42, and a true value which is true position error information (namely, the actual position) among the servo areas 42. Since the true value cannot be obtained during the operation, the true value can be acquired by analyzing the recording surface of the magnetic disk 11 after data writing, or can be obtained by the simulator 352 that simulates the position error information. A label created from the true value is used as training data when learning of the determination model 351.

Figure 5:
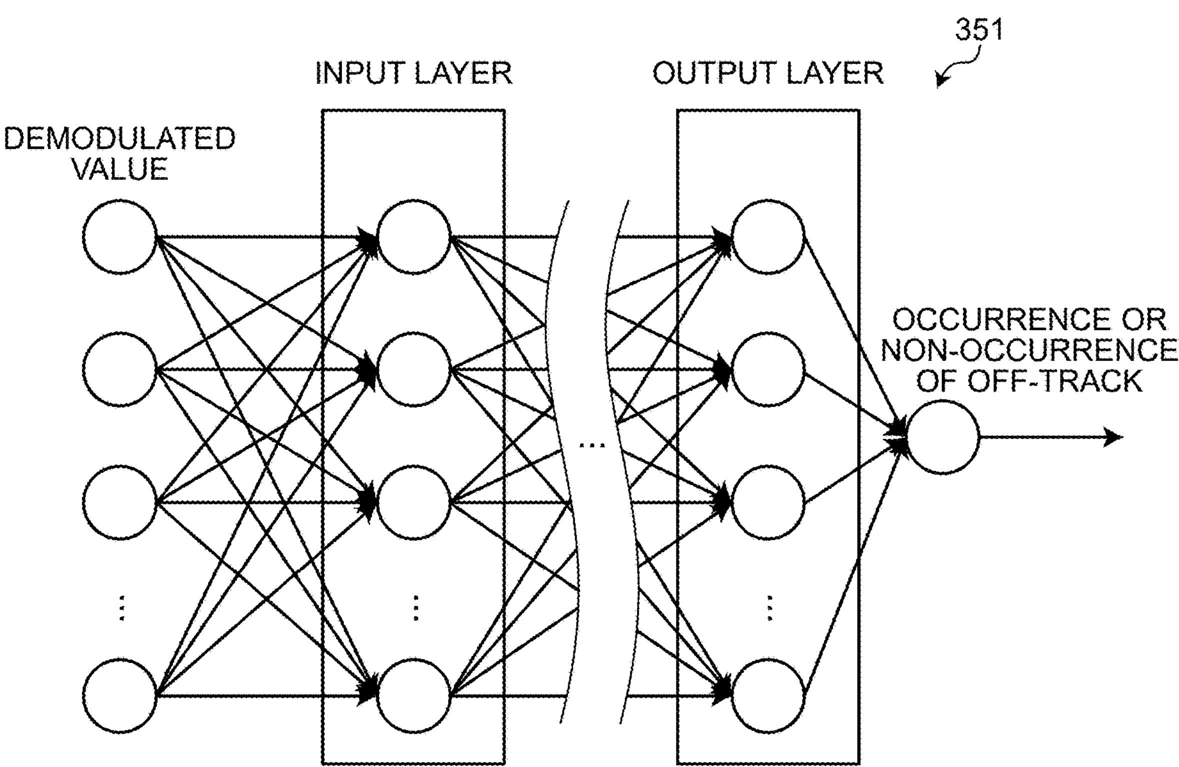
FIG. 5 is a diagram illustrating an example of a configuration of a determination model including a multi-layer perceptron neural network according to the first embodiment.

The determination model 351 is configured by, for example, a multi-layer perceptron (MLP) neural network. FIG. 5 is a diagram illustrating an example of a configuration of the determination model 351 including the multi-layer perceptron neural network according to the first embodiment.

In the determination model 351, as illustrated in FIG. 5, demodulated values, namely, pieces of position error information are input to an input layer, and the occurrence or non-occurrence of off-track is output as an output value from an output layer via an intermediate layer (not illustrated). The occurrence or non-occurrence of off-track becomes an output value (for example, "1", namely, equivalent to write-prohibited) indicating the occurrence of off-track when the distance from the target position to the position of the magnetic head 22 exceeds the WOS, and becomes an output value (for example, "0", namely, equivalent to write-enabled) indicating the non-occurrence of off-track when the distance does not exceed the WOS.

Figure 6:
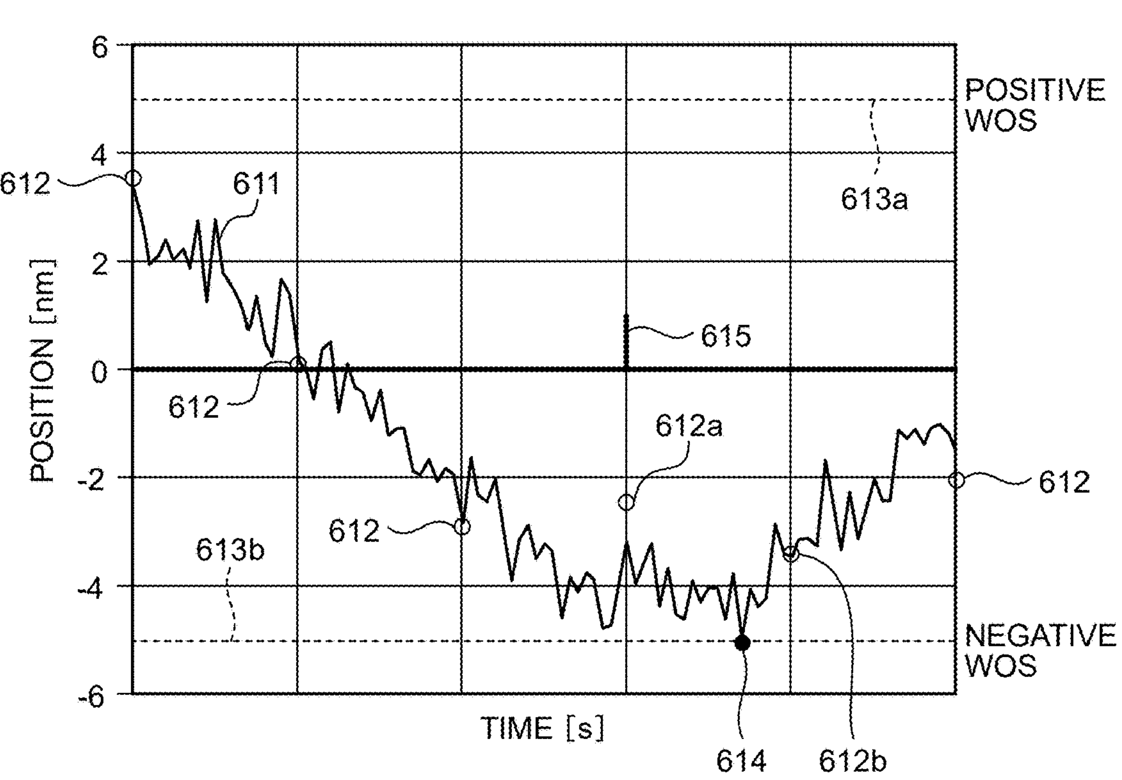
FIG. 6 is a diagram for describing an example of learning data for learning the determination model according to the first embodiment.

FIG. 6 is a diagram for describing an example of learning data for learning the determination model 351 according to the first embodiment. In the graph illustrated in FIG. 6, a vertical axis indicates a position in the radial direction of the magnetic disk 11, and a horizontal axis indicates a time.

In the graph of FIG. 6, a dotted line 613*a* represents a positive WOS, and a dotted line 613*b* represents a negative WOS. Reference numerals 612, 612*a*, and 612*b* indicate pieces of position error information (demodulated values) obtained by reading servo information from each of the servo areas 42, namely, the sampled position error information (demodulated values). A solid line 611 indicates a true value that is position information (namely, the actual position) among the servo areas 42.

In the present embodiment, it is assumed that the controller 30 learns the determination model 351. In this case, true value data illustrated in FIG. 6 is prepared in advance. Then, the controller 30 inputs the demodulated values 612, 612*a*, and 612*b* illustrated in FIG. 6 to the determination model 351. As illustrated in FIG. 6, the true value at the position indicated by the reference numeral 614 between the demodulated value 612*a* and the demodulated value 612*b* exceeds the WOS, and off-track occurs in there. Reference numeral 615 indicates off-track occurrence data.

Therefore, the controller 30 performs learning of the determination model 351 such that the output value becomes a value indicating the occurrence of off-track. The learning is performed by using, as the training data, the label created from the demodulated value and the true value and calculating a combined load between the layers of the neural network of the determination model 351 through a method such as a back propagation method.

The determination model 351 is not limited to be applied to the multi-layer perceptron neural network. For example, the determination model 351 can be configured by a recurrent neural network (RNN).

Figure 7:
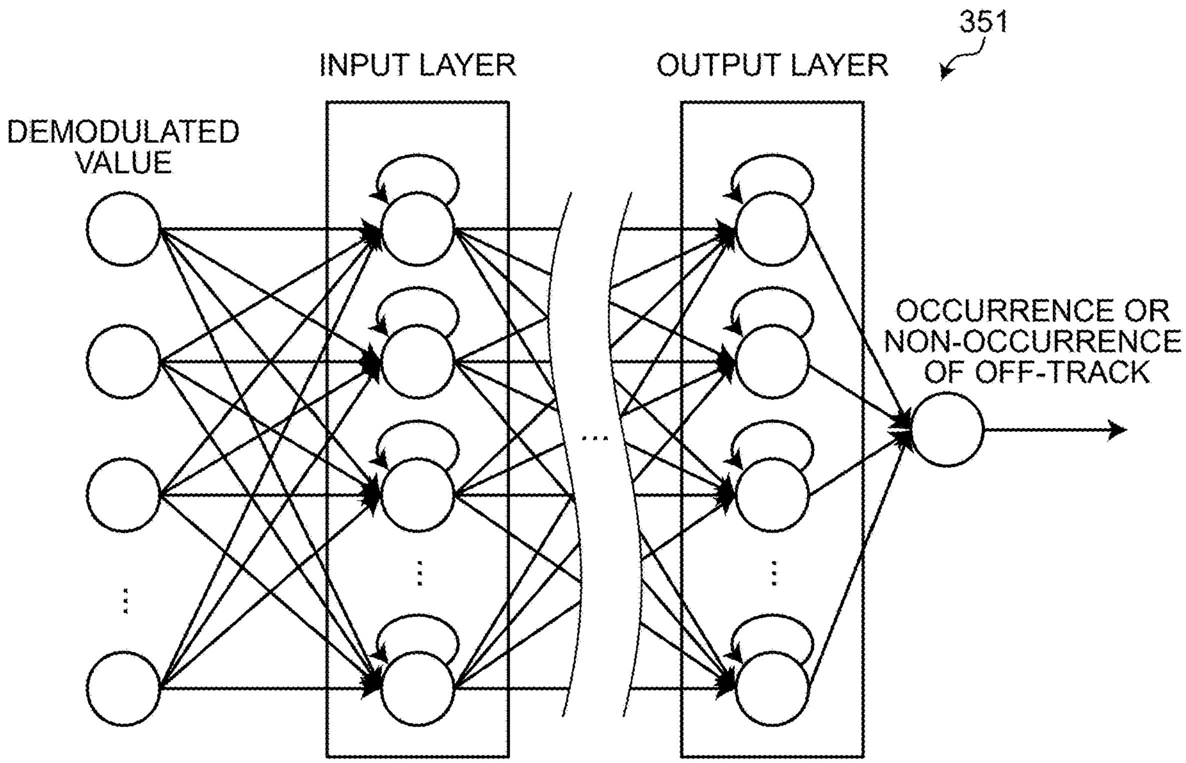
FIG. 7 is a diagram illustrating an example of a configuration of a determination model including a recurrent neural network according to the first embodiment.

FIG. 7 is a diagram illustrating an example of a configuration of the determination model 351 including the recurrent neural network according to the first embodiment. In the determination model 351, as illustrated in FIG. 7, demodulated values, namely, pieces of position error information are input to an input layer, and the occurrence or non-occurrence of off-track is output as an output value from an output layer via an intermediate layer (not illustrated). As illustrated in FIG. 7, the output of each layer is output to a next layer and is input to its own layer. Use of the occurrence or non-occurrence of off-track indicated by the output value is similar to that in the determination model 351 with the multi-layer perceptron neural network illustrated in FIG. 5.

Moreover, the determination model 351 can be configured by a long short term memory (LSTM) network.

Figure 8:
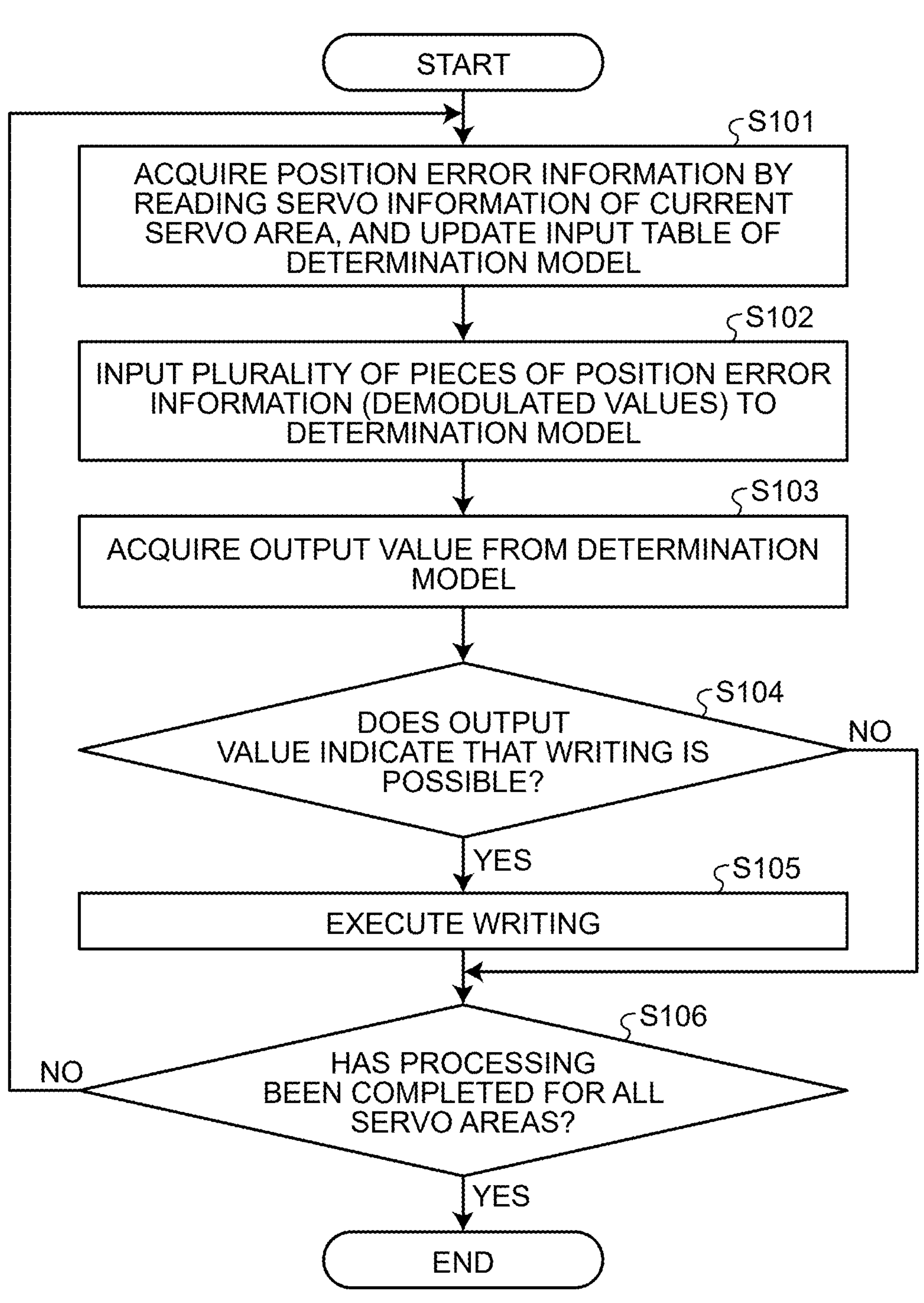
FIG. 8 is a flowchart illustrating an example of a procedure of control processing according to the first embodiment.

Next, control processing by the magnetic disk device 1 according to the present embodiment configured as described above will be described. FIG. 8 is a flowchart illustrating an example of a procedure of the control processing according to the first embodiment.

First, the controller 30 causes the magnetic head 22 to read servo information of the current servo area 42, acquires position error information (demodulated value), and updates an input table of the determination model 351 (S101). The controller 30 inputs the acquired pieces of position error information (demodulated values) contained in the input table to the determination model 351 (S102).

Next, the controller 30 acquires an output value output from the determination model 351 (S103). The controller 30 determines whether or not the output value output from the determination model 351 indicates that writing is possible (S104). When the output value indicates that writing is possible (S104: Yes), the controller 30 determines that off-track will not occur, and executes data writing to a data area up to a next servo sector (S105).

On the other hand, when the output value indicates that writing is not possible in S104 (S104: No), the controller 30 determines that off-track will occur and does not execute data writing.

The controller 30 determines whether or not the processing has been completed for all the servo areas 42 of the track 41 (S106). In a case where the processing has not been completed for all the servo areas 42 of the track 41 (S106: No), the controller 30 repeatedly executes the processing from S101 to S105.

When the processing has been completed for all the servo areas 42 of the track 41 (S106: Yes), the processing ends.

Figure 9:
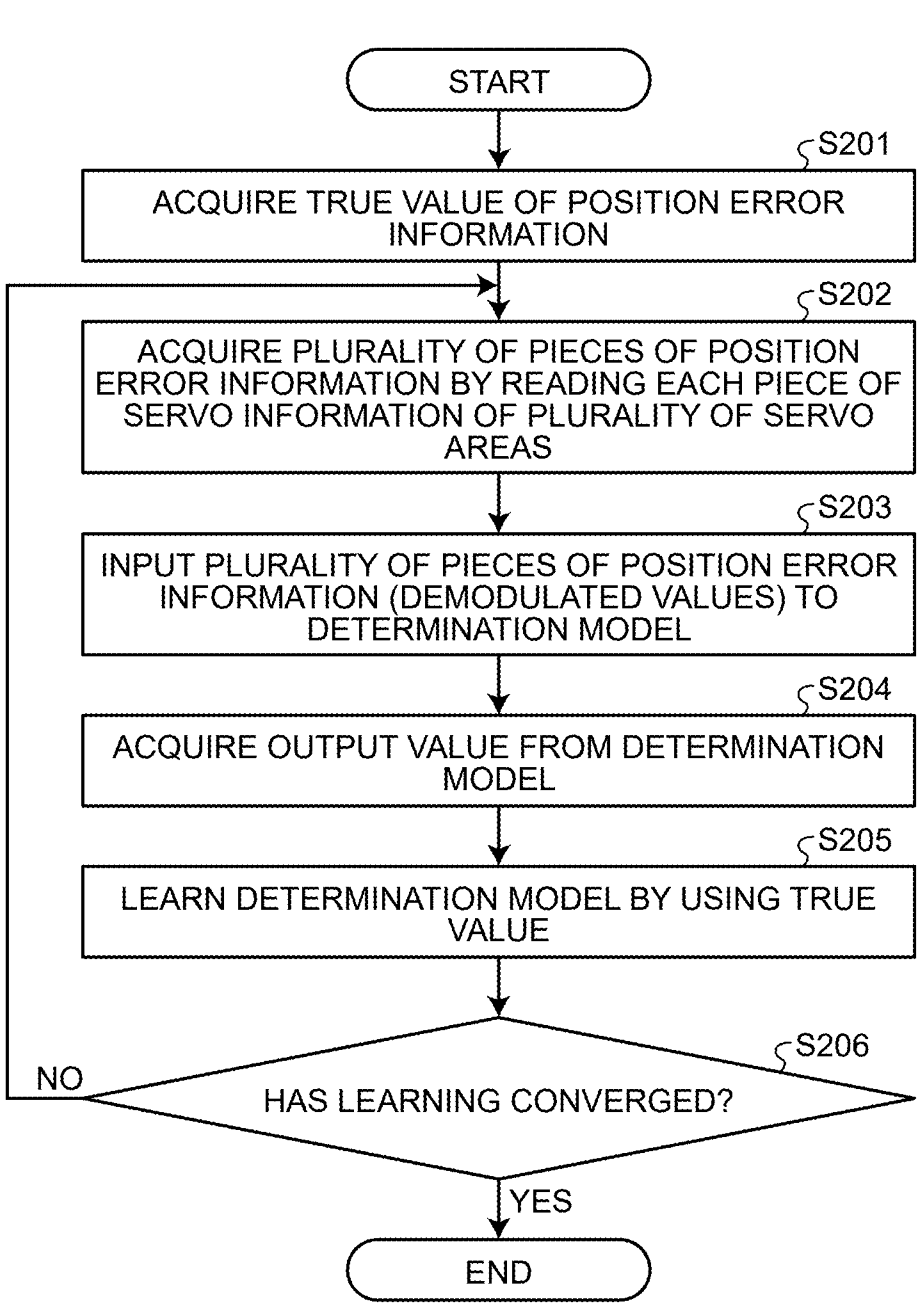
FIG. 9 is a flowchart illustrating an example of a procedure of learning processing of the determination model according to the first embodiment.

Next, learning processing of the determination model 351 by the controller 30 will be described. FIG. 9 is a flowchart illustrating an example of a procedure of the learning processing of the determination model 351 according to the first embodiment.

First, the controller 30 acquires a true value of the position error information by the above-described method (S201). Next, the controller 30 causes the magnetic head 22 to read each piece of servo information of the servo areas 42 to acquire pieces of position error information (demodulated values) (S202). Next, the controller 30 inputs the acquired pieces of position error information (demodulated values) to the determination model 351 (S203).

Next, the controller 30 acquires an output value output from the determination model 351 (S204). Next, the controller 30 learns the determination model 351 by using the true value acquired in S201 (S205).

Then, the controller 30 determines whether or not the learning has converged (S206). In a case where the learning has not converged (S206: No), the controller 30 repeatedly executes the processing from S201 to S205.

On the other hand, in a case where the learning has converged (S206: Yes), the processing ends.

In a comparative example, whether or not a position in next sampling exceeds a WOS is determined by using a method such as multiple regression from position error information (namely, the demodulated value) with noise obtained in each sampling cycle of pieces of servo information, a speed calculated by a control system based on the demodulated value, an estimated value of position information in the next sampling, and the like. Therefore, in the comparative example, even when determination accuracy is not sufficient or the WOS is exceeded at the position between the sampled servo areas, namely, even when off-track occurs in there, it is difficult to detect off-track.

In contrast to the comparative example, the magnetic disk device 1 according to the present embodiment includes the controller 30 that determines whether or not the distance from the target position related to the first track to the position of the magnetic head 22 exceeds the WOS. The position of the magnetic head 22 fluctuates from the target position toward the side of the second track during the execution of the writing to the first track among the tracks 41. The determination is performed by using the pieces of position error information obtained by reading the servo information from each of the servo areas 42, and using the determination model 351. The determination model 351 is a learned model configured to receive the pieces of position error information and output a value representing whether or not the distance exceeds the WOS while the magnetic head 22 moves above the servo areas 42. When the distance does not exceed the WOS, writing to the first track is performed. When the distance exceeds the WOS, writing to the first track is not performed.

Therefore, according to the present embodiment, the excess of the WOS at the position between the servo areas 42 can be determined by using the determination model 351. As a result, the off-track can be detected with high accuracy, and the operation of the magnetic head 22 can be appropriately controlled.

Figure 10:
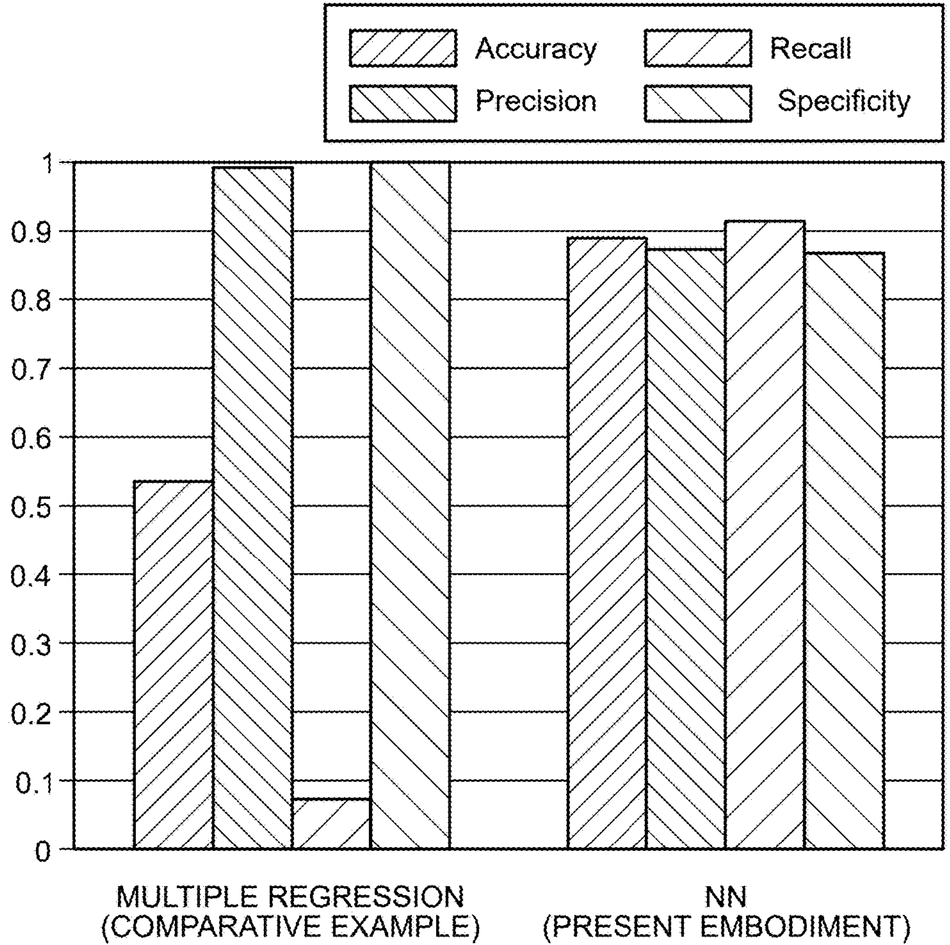
FIG. 10 is a diagram illustrating an example of a difference in effect between the first embodiment and a comparative example.

FIG. 10 is a diagram illustrating an example of a difference in effect between the first embodiment and the comparative example. In FIG. 10, a left side is the comparative example using the multiple regression method, and a right side is the example of the present embodiment using the determination model 351. A horizontal axis indicates evaluation indexes for each of the comparative example and the present embodiment, namely, the accuracy, the recall, the precision, and the specificity. A vertical axis represents a ratio indicated by each evaluation index.

The accuracy is an index indicating a ratio of correct predictions to all predictions by the determination model 351. In addition, the recall is an index indicating a ratio of cases where the model was able to predict correct among cases where the predictions were actually correct. In the present embodiment, it is a ratio of cases where the determination model 351 was able to detect off-track without missing the off-track among cases where the predictions were actually off-track, and the higher the ratio, the fewer cases where the off-track was missed.

The precision is an index representing a ratio of cases that were actually correct among cases that were predicted to be correct by the model. In the present embodiment, the precision is a ratio of cases that were actually off-track among the cases that were predicted to be off-track by the determination model 351.

The specificity is an index representing a ratio of cases that were actually false among cases that were predicted to be false by the model. In the present embodiment, it is a ratio of cases that were not actually off-track among cases that were predicted to be not off-track by the determination model 351.

In the present embodiment, as compared with the comparative example, the accuracy is improved and the recall is high, such that it can be seen that missing of the off-track between the servo areas 42 is reduced and the off-track can be predicted with high accuracy.

In the magnetic disk device 1 according to the present embodiment, the determination model 351 is a learned model learned by using the pieces of position error information and the true value that is the actual position among the servo areas 42. Therefore, according to the present embodiment, the off-track can be detected with higher accuracy by using the learned model, and the operation of the magnetic head 22 can be more appropriately controlled.

Second Embodiment

In the first embodiment, the method of generating learning data is not particularly limited, but in the second embodiment, learning data is generated by using a simulator.

The configurations of the magnetic disk device 1 and the magnetic disk 11 according to the present embodiment are similar to those of the first embodiment.

Figure 11:
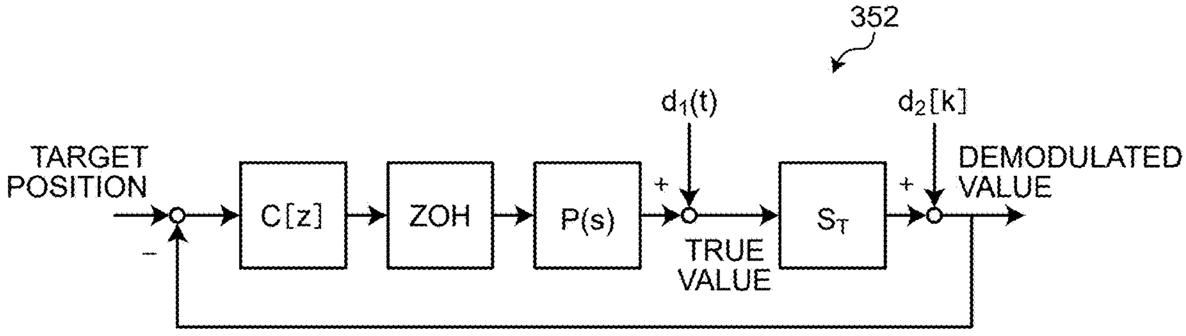
FIG. 11 is a control block diagram illustrating an example of a configuration of a simulator used in a second embodiment.

FIG. 11 is a control block diagram illustrating an example of a configuration of the simulator 352 used in the second embodiment. The simulator 352 of the present embodiment mainly includes a controller C(z), a zero-order hold circuit ZOH, a control target P(s), and a sampler $S_T$ with a sampling period T.

The controller C(z) inputs a difference between a target position and a demodulated value (position error information) fed back, and outputs an estimated speed of the magnetic head 22, an estimated position of the magnetic head 22 in the servo area of the next sampling, and a control input. The zero-order hold circuit ZOH converts a discrete control input of the output from the controller C(z) into a continuous value. The sampler $S_T$ receives a true value obtained by adding the output from P(s) and a disturbance $d_1(t)$, and outputs a discrete value. $d_1(t)$ is a disturbance of a server rack or the like provided with the magnetic disk device 1. $d_2(t)$ is noise with respect to the demodulated value.

The controller 30 of the present embodiment determines whether or not the distance from the target position to the position of the magnetic head 22 exceeds the WOS using the pieces of position error information, the estimated speed of the magnetic head 22 output from the controller C(z) of the simulator, the estimated position of the magnetic head 22 in the servo area to be sampled next output from the controller C(z), and the determination model 351.

The determination model 351 of the present embodiment is a learned model learned by using the pieces of position error information (demodulated values), the true value calculated by the simulator, the estimated speed of the magnetic head 22 output from the controller C(z) of the simulator, and the estimated position of the magnetic head 22 in the servo area to be sampled next output from the controller C(z). Other functions and configurations of the determination model 351 are similar to those of the first embodiment.

Figure 12:
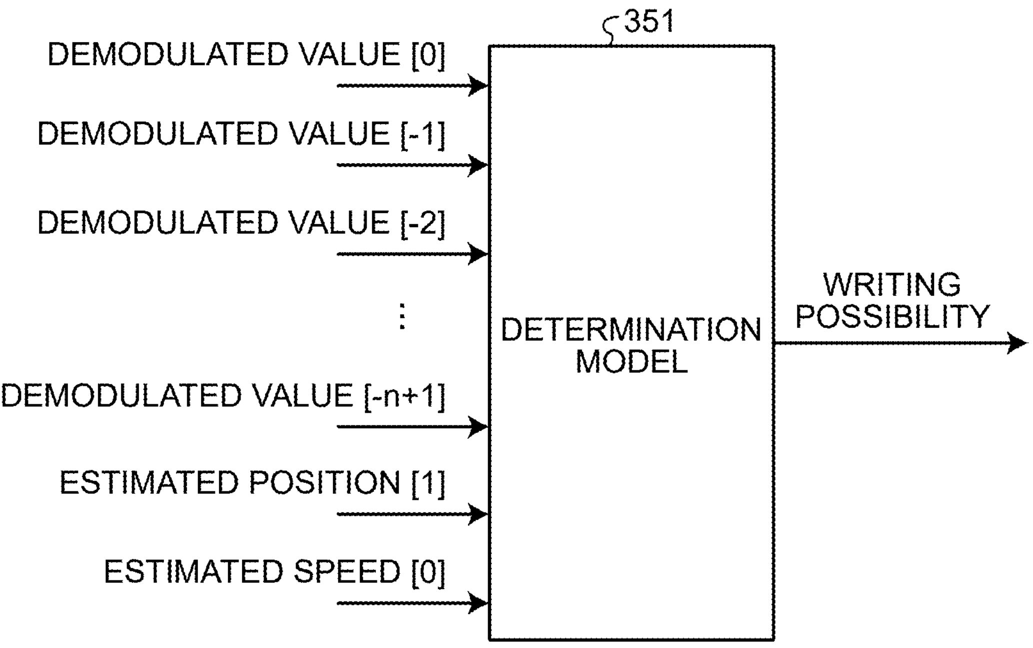
FIG. 12 is a diagram illustrating an example of input and output of a determination model according to the second embodiment.

FIG. 12 is a diagram illustrating an example of input and output of the determination model 351 according to the second embodiment. As illustrated in FIG. 12, the determination model 351 receives the pieces of position error information (namely, the demodulated values) obtained by reading servo information from each of the servo areas 42, the estimated position, and the estimated speed, and outputs writing possibility as an output value. The meaning of the writing possibility is similar to that in the first embodiment.

Figure 13:
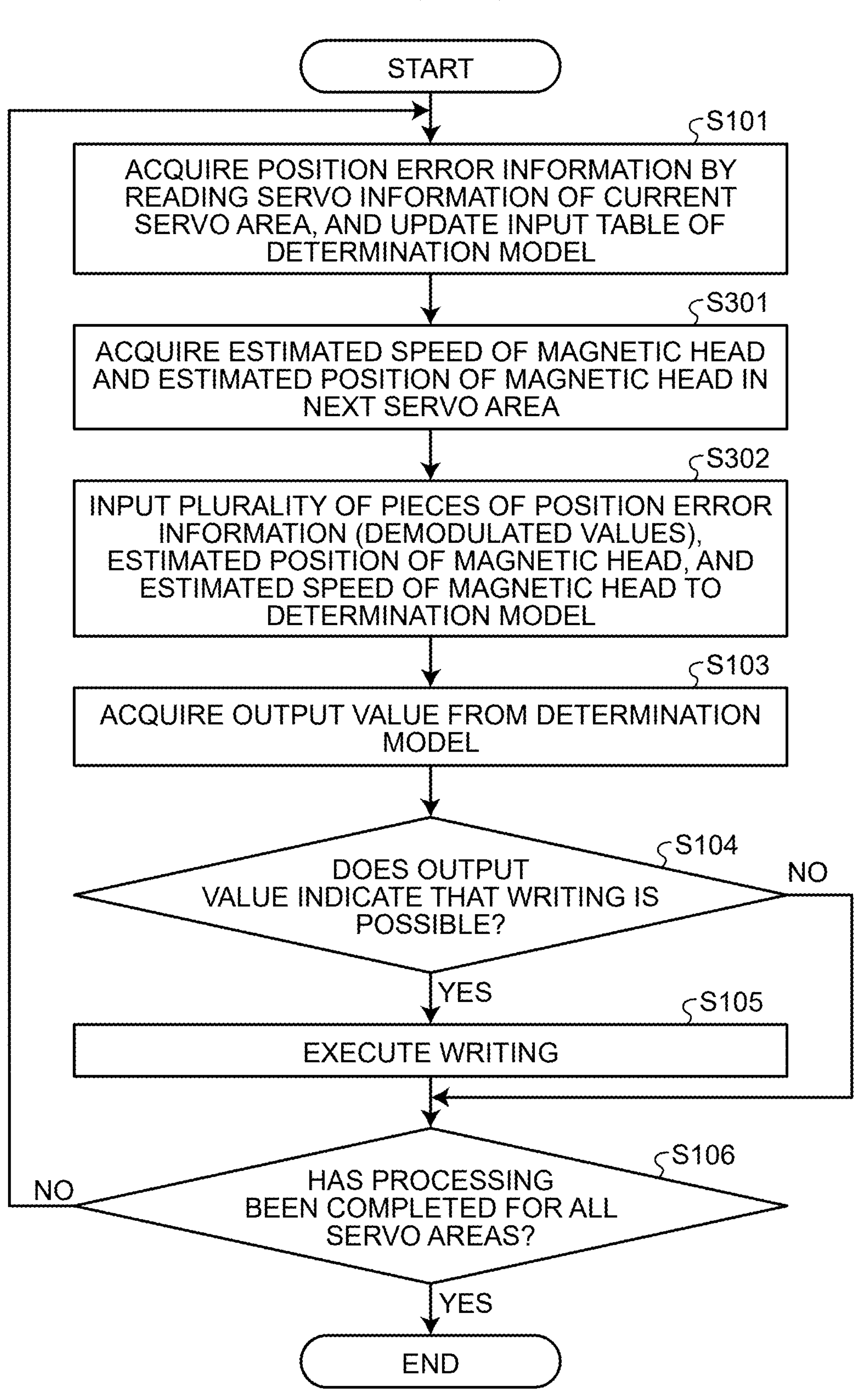
FIG. 13 is a flowchart illustrating an example of a procedure of control processing according to the second embodiment.

Next, control processing by the magnetic disk device 1 according to the present embodiment configured as described above will be described. FIG. 13 is a flowchart illustrating an example of a procedure of the control processing according to the second embodiment.

First, similarly to the first embodiment, the controller 30 causes the magnetic head 22 to read each piece of servo information of the servo areas 42 to acquire pieces of position error information (demodulated values) (S101).

Next, the controller 30 acquires an estimated speed of the magnetic head 22 output from the controller C(z) of the simulator and an estimated position of the magnetic head 22 in the servo area to be sampled next output from the controller C(z) (S301). Then, the controller 30 inputs the acquired pieces of position error information (demodulated values), the estimated position, and the estimated speed to the determination model 351 (S302).

Next, the controller 30 acquires an output value output from the determination model 351 (S103). The subsequent processing from S104 to S106 is performed similarly to the first embodiment.

Figure 14:
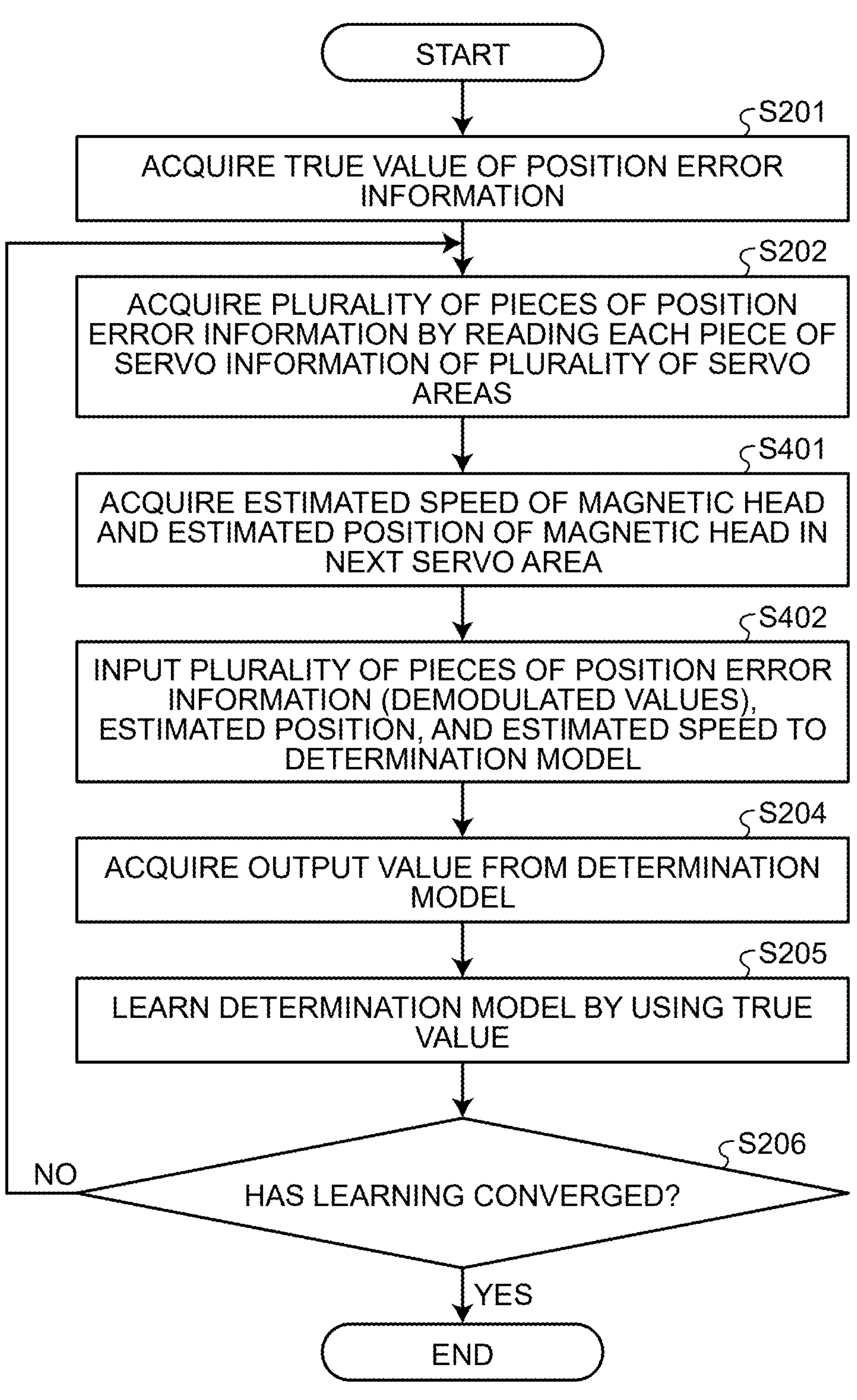
FIG. 14 is a flowchart illustrating an example of a procedure of learning processing of the determination model according to the second embodiment.

Next, learning processing of the determination model 351 by the controller 30 will be described. FIG. 14 is a flowchart illustrating an example of a procedure of the learning processing of the determination model 351 according to the second embodiment. The acquisition of the true value of the position error information (S201) and the acquisition of the pieces of position error information (demodulated values) (S202) are performed in the same manner as in the first embodiment.

Next, the controller 30 acquires an estimated speed of the magnetic head 22 output from the controller C(z) of the simulator and an estimated position of the magnetic head 22 in the servo area to be sampled next output from the controller C(z) (S401). Then, the controller 30 inputs the acquired pieces of position error information (demodulated values), the estimated position, and the estimated speed to the determination model 351 (S402).

Next, the controller 30 acquires an output value output from the determination model 351 (S204). The subsequent processing of S205 and S206 is performed similarly to the first embodiment.

As described above, in the magnetic disk device 1 according to the present embodiment, the controller 30 determines whether or not the distance from the target position to the position of the magnetic head 22 exceeds the WOS by using the pieces of position error information, the estimated speed of the magnetic head estimated by the simulator, the estimated position of the magnetic head in the servo area 42 to be sampled next, and the determination model 351.

Therefore, according to the present embodiment, since the excess of the WOS at the position between the servo areas 42 can be determined by using the determination model 351, the off-track can be detected with high accuracy, and the operation of the magnetic head 22 can be appropriately controlled.

In addition, the magnetic disk device 1 according to the present embodiment is a learned model learned by using the pieces of position error information (demodulated values), the true value calculated by the simulator, the estimated speed, and the estimated position. Therefore, according to the present embodiment, the off-track can be detected with higher accuracy by using the learned model, and the operation of the magnetic head 22 can be more appropriately controlled.

In the above embodiment, the learning processing of the determination model 351 is performed by the controller 30 of the magnetic disk device 1, but the present invention is not limited thereto. In one example, the determination model 351 is installed in a device other than the magnetic disk device 1, such as a learning device including a computer. Then, the learning device executes the learning processing on the determination model 351 to obtain a learned model, and the learned model is installed in the magnetic disk device 1.

In the magnetic disk device 1 according to the above embodiment, the case where the writing method is a conventional magnetic recording (CMR) method has been described as an example, but the present invention can be similarly applied to a shingled magnetic recording (SMR) method.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk on which tracks are provided, the tracks each including data areas and servo areas in which servo information is recorded, the data areas and the servo areas being alternately arranged in a circumferential direction of the magnetic disk;

a magnetic head configured to perform reading and writing from and to the tracks; and a controller configured to perform, by using a determination model, a determination on whether or not a distance in a radial direction from a target position related to a first track among the tracks to a position of the magnetic head exceeds a threshold, the position of the magnetic head fluctuating from the target position toward a second track different from the first track among the tracks during execution of writing to the first track, the determination being performed by giving, to the determination model, an input of pieces of position error information including a piece of position error information about one servo area in the first track and obtaining an output value from the determination model in response to the input, the output value indicating whether or not the distance exceeds the threshold while the magnetic head moves in the circumferential direction above the one servo area and one data area between the one servo area and a next servo area, perform writing to the one data area of the first track in a case where the output value indicates that the distance does not exceed the threshold, and perform no writing to the one data area of the first track in a case where the output value indicates that the distance exceeds the threshold, wherein the determination model is a machine learning model leaned before the determination by using pieces of position error information obtained by reading the servo information from two or more servo areas and a first true value indicating an actual position of the magnetic head moving in the circumferential direction above the first track including the two or more servo areas.

2. The magnetic disk device according to claim 1, wherein the controller is configured to perform the determination of whether or not the distance exceeds the threshold by using the pieces of position error information, an estimated speed of the magnetic head estimated by a simulator serving to simulate the position error information, an estimated position of the magnetic head in a next servo area estimated by the simulator, and the determination model.

3. The magnetic disk device according to claim 2, wherein the determination model is a learned model learned by using the pieces of position error information, a second true value calculated by the simulator, the estimated speed, and the estimated position.

4. The magnetic disk device according to claim 1, wherein the determination model is configured by a multi-layer perceptron (MLP) neural network.

5. The magnetic disk device according to claim 1, wherein the determination model is configured by a recurrent neural network (RNN).

6. The magnetic disk device according to claim 1, wherein the determination model is configured by a long short term memory (LSTM) network.

7. A control method of controlling a magnetic disk device, the magnetic disk device including a magnetic disk on which tracks are provided, each of the tracks including data areas and a servo area servo areas in which servo information is recorded, the data areas and the servo areas being alternately arranged in a circumferential direction of the magnetic disk, the magnetic disk device including a magnetic head to perform reading and writing from and to the tracks, the control method comprising:

performing, by using a determination model, a determination on whether or not a distance in a radial direction from a target position related to a first track among the tracks to a position of the magnetic head exceeds a threshold, the position of the magnetic head fluctuating from the target position toward a second track different from the first track among the tracks during execution of writing to the first track, the determination being performed by giving, to the determination model, an input of pieces of position error information including a piece of position error information about one servo area in the first track and obtaining an output value from the determination model in response to the input, the output value indicating whether or not the distance exceeds the threshold while the magnetic head moves in the circumferential direction above the one servo area and one data area between the one servo area and a next servo area;

performing writing to the one data area of the first track in a case where the output value indicates that the distance does not exceed the threshold; and performing no writing to the one data area of the first track in a case where the output value indicates that the distance exceeds the threshold, wherein the determination model is a machine learning model leaned before the determination by using pieces of position error information obtained by reading the servo information from two or more servo areas and a first true value indicating an actual position of the magnetic head moving in the circumferential direction above the first track including the two or more servo areas.

8. The control method according to claim 7, wherein the determining is performed by using the pieces of position error information, an estimated speed of the magnetic head estimated by a simulator serving to simulate the position error information, an estimated position of the magnetic head in a next servo area estimated by the simulator, and the determination model.

9. The control method according to claim 8, wherein the determination model is a learned model learned by using the pieces of position error information, a second true value calculated by the simulator, the estimated speed, and the estimated position.

10. The control method according to claim 7, wherein the determination model is configured by a multi-layer perceptron (MLP) neural network.

11. The control method according to claim 7, wherein the determination model is configured by a recurrent neural network (RNN).

12. The control method according to claim 7, wherein the determination model is configured by a long short term memory (LSTM) network.

13. A learning method implemented by a learning device, the learning method comprising:

acquiring pieces of position error information obtained by reading servo information from a first track out of tracks provided on a magnetic disk of a magnetic disk device by a magnetic head of the magnetic disk device, the tracks each including data areas and servo areas in which the servo information is recorded, the data areas and the servo areas being alternately arranged in a circumferential direction of the magnetic disk, the magnetic head performing reading and writing from and to the tracks;

acquiring a first true value indicating an actual position of the magnetic head moving in the circumferential direction above the first track;

inputting the pieces of position error information to a determination model;

acquiring an output value output from the determination model; and learning the determination model by using the first true value, wherein the learning the determination model is performed to output an output value, in response to receiving an input of the pieces of position error information, the output value representing whether or not the distance exceeds the threshold while the magnetic head moves in the circumferential direction above one servo area in the first track and one data area between the one servo area and a next servo area.

14. The learning method according to claim 13, further comprising:

acquiring a second true value calculated by a simulator serving to simulate the position error information; and acquiring an estimated speed of the magnetic head estimated by the simulator and an estimated position of the magnetic head in a next servo area estimated by the simulator, wherein the inputting includes inputting the estimated speed and the estimated position to the determination model, and wherein the learning includes learning the determination model by using the second true value.

* * * * *